United States Patent
Chen et al.

(10) Patent No.: US 9,559,772 B2
(45) Date of Patent: Jan. 31, 2017

(54) METHOD AND SYSTEM FOR ACHIEVING COMMUNICATION BETWEEN MOBILE DEVICE AND ELECTRONIC DEVICE

(71) Applicant: NOVELTEK SEMICONDUCTOR CORP., Hsinchu (TW)

(72) Inventors: Jiunn-Kuang Chen, Taipei (TW); Meng-Hsien Hsieh, New Taipei (TW); Ming-Cheng Sun, Taichung (TW)

(73) Assignee: EOSMEM Corporation, Hsinchu County (TW)

( * ) Notice: Subject to any disclaimer, the term of this patent is extended or adjusted under 35 U.S.C. 154(b) by 35 days.

(21) Appl. No.: 14/657,054

(22) Filed: Mar. 13, 2015

(65) Prior Publication Data
US 2016/0269111 A1 Sep. 15, 2016

(51) Int. Cl.
*H04B 10/00* (2013.01)
*H04B 10/116* (2013.01)
*H04J 14/00* (2006.01)

(52) U.S. Cl.
CPC .................. *H04B 10/116* (2013.01)

(58) Field of Classification Search
CPC .............. H04B 10/114; H04B 10/116
USPC ........................................ 398/106, 118, 130
See application file for complete search history.

(56) References Cited

U.S. PATENT DOCUMENTS

2016/0020854 A1* 1/2016 Engel .................. H04B 10/116
398/118

FOREIGN PATENT DOCUMENTS

| CN | 201051745 | 4/2008 |
|----|-----------|--------|
| CN | 102388678 | 3/2012 |
| CN | 103795936 | 5/2014 |

* cited by examiner

*Primary Examiner* — Daniel Dobson
(74) *Attorney, Agent, or Firm* — Che-Yang Chen; Law offices of Scott Warmuth

(57) ABSTRACT

A method and a system for achieving communication between a mobile device and an electronic device are disclosed. The system includes a mobile device, having a lighting unit, which modulates light beams therefrom with a message signal by a communicating mode; a light beam receiver, connected to or embedded in an electronic device, for receiving the modulated light beams and transforming the modulated light beams into an electric signal; and a demodulator, equipped in the electronic device, for demodulating the electric signal to get the message signal. Light beams are used as media to transmit signal from the mobile device to the electronic device.

18 Claims, 13 Drawing Sheets

| Packet \ Mode | Number of Shine of Light Beams in Each Packet ||||||| Action for Device ||
| | 1st Packet | 2nd Packet | 3rd Packet | 4th Packet | 5th Packet | 6th Packet | 7th Packet | High Luminance Flash | Refrigerator |
| --- | --- | --- | --- | --- | --- | --- | --- | --- | --- |
| 1 | 12 | 10 | 8 | 5 | 1 | 7 | 11 | Flash soon after Message Is Received | Temperature at 17 degree |
| 2 | 12 | 2 | 10 | 6 | 5 | 9 | 3 | Flash after 0.1 second | Temperature at 16 degree |
| 3 | 12 | 7 | 3 | 11 | 12 | 8 | 5 | Flash after 0.2 second | Temperature at 15 degree |
| 4 | 12 | 4 | 8 | 8 | 2 | 1 | 7 | Flash with Maximal Luminance | Defrosting |

Fig. 8

METHOD AND SYSTEM FOR ACHIEVING COMMUNICATION BETWEEN MOBILE DEVICE AND ELECTRONIC DEVICE

FIELD OF THE INVENTION

The present invention relates to a method and a system for achieving communication. More particularly, the present invention relates to a method and a system for achieving communication between a mobile device and an electronic device by modulating light beams.

BACKGROUND OF THE INVENTION

Mobile phones have played a very important role in daily life. Not like other electronic devices, such as a Personal Digital Assistant (PDA) which may die out as time goes by, a mobile phone incorporates lots of functions with components embedded. It looks not only like a phone, but a camera, a micro-computer, a music player, or even a projector. Moreover, a mainstream of mobile phone design is to be able to co-work with other electronic devices. For example, a smart phone can connect to a television or a refrigerator so that controls of these electronic devices are available by finger touching on the touch screen. Applications of mobile phones are diversified and functions of the mobile phones are keeping increasing.

A mobile phone is a standalone device. Therefore, in order to connect to other electronic devices, a suitable connecting media is very important for different application. The media may be wired. A USB cable can be used to link the mobile phone with a desktop computer. The media may be wireless. Electromagnetic wave is the most applied one. Thus, the mobile phone can use a Wi-Fi or Bluetooth module to achieve communication with other electronic devices. The media mentioned above are common ways which utilize existing I/O modules. However, there is also an I/O module which can play the connecting media but ignored. This is a lighting module in the mobile phone.

The lighting module is usually used to provide light beams for a camera module when a photographed target is located in a dark environment. For consideration of power consumption, a Light Emitting Diode (LED) or a LED module is often employed. Light beams from the lighting module may have different aspects. Hence, a message or command can be transmitted. However, applications of the lighting module as a connecting media are hardly seen in the prior arts.

An invention related to the application of the lighting module in the mobile phone is disclosed in the China Utility Model Patent No. 200620017306.9. Please refer to FIG. 1 along with the description below. The Utility Model patent is about a mobile phone communication system. The mobile phone communication system includes a first mobile phone 1 which has a first central processing unit 2 and a flash lamp 3. The first central processing unit 2 converts a massage with a pre-set coding rule into a corresponding control signal, and further controls the flash lamp 3 to send out a flashing signal. On the other hand, the mobile phone communication system further includes a second mobile phone 4 which has a second central processing unit 5 and a light sensor 6. The light sensor 6 receives the flashing signal and the second central processing unit 5 decodes the flashing signal. With the system mentioned above, messages can be sent through a camera module in a mobile phone along with a coding method, such as the Morse code. A novel communication style used for sight distance is available.

Although the China Utility Model Patent No. 200620017306.9 has indicated a way to apply the lighting module in the mobile phone, there are some problems needed to be improved. First, there is no explanation in what format the flashing signal is sent. Second, the application is only workable within two mobile phones. A wider application should be available. Therefore, a method and a system for achieving communication between a mobile phone and an electronic device to improve the above problems are desired. In addition, the method and system should be applied to other mobile devices, such as a tablet.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to improve the problems mentioned above, an aspect of the present invention is to disclose a system for achieving communication between a mobile device and an electronic device. The system includes: a mobile device, having a lighting unit, which modulates light beams therefrom with a message signal by a communicating mode; a light beam receiver, connected to or embedded in an electronic device, for receiving the modulated light beams and transforming the modulated light beams into an electric signal; and a demodulator, equipped in the electronic device, for demodulating the electric signal to get the message signal.

According to the present invention, the communicating mode is translating bits of the message signal into corresponding luminance of the light beams, corresponding on and off of the light beams, or corresponding frequency of the light beams varying between different luminance. The message signal includes a number of packets arranged in sequence, each packet containing at least one on-message. At least the first packet has a designated format of on-messages. The communicating mode is segmenting a specified period into a plurality of sub-periods which have the same number as the packets, converting each on-message into a light feature or all on-messages in a packet into a specified light feature, and sequentially providing a number of light feature the same as the number of on-message in a packet within a sub-period, or the specified light features corresponding to each packet. A padding time exists between two sequent sub-periods. Each sub-period has the same duration. The mobile device is a mobile phone, a tablet or a laptop computer. The light feature is a shine of light beams, a luminance of light beams, or a combination thereof. One sub-period is terminated if a terminating time passes by after the last light feature vanishes.

Preferably, the lighting unit is a Light Emitting Diode (LED) or a LED module. The light beam receiver is a photodetector. The photodetector may be a Complementary Metal Oxide Semiconductor (CMOS) sensor module, a Charge Coupled Device (CCD) sensor module, a Passive Infrared (PIR) sensor, a photodiode, a photodiode module or an ambient light sensor.

Another aspect of the present invention is to disclose a method for achieving communication between a mobile device and an electronic device. The method includes the steps of: providing a mobile device which has a lighting unit and a light beam receiver; modulating light beams from the lighting unit with a message signal by a communicating mode; receiving the light beams by the light beam receiver;

and demodulating modulated light beams to get the message signal. The light beam receiver is connected to or embedded in an electronic device.

According to the present invention, the message signal comprises a plurality of packets arranged in sequence, each packet containing at least one on-message. At least the first packet has a designated format of on-messages. The communicating mode is segmenting a specified period into a number of sub-periods which have the same number as the packets, converting each on-message into a light feature or all on-messages in a packet into a specified light feature, and sequentially providing a number of light feature the same as the number of on-message in a packet within a sub-period, or the specified light features corresponding to each packet. A padding time exists between two sequent sub-periods. Each sub-period has the same duration. The light feature is a shine of light beams, a luminance of light beams, or a combination thereof.

BRIEF DESCRIPTION OF THE DRAWINGS

FIG. 8 tabulates different modes for shine of light beams in each packet with different actions for a device.

DETAILED DESCRIPTION OF THE PREFERRED EMBODIMENTS

Figure 1:
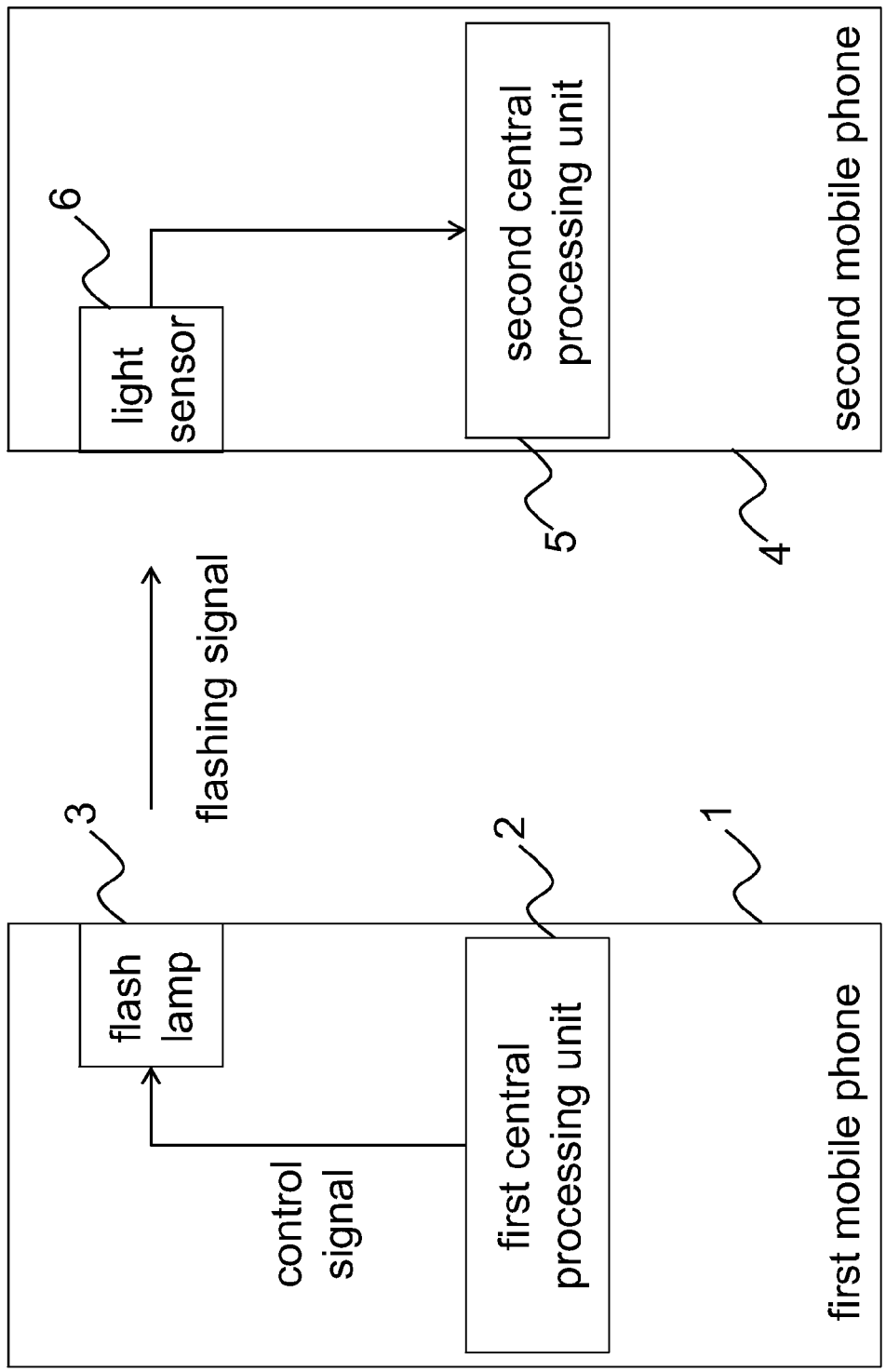
FIG. 1 is a schematic diagram of a mobile phone communication system in a prior art.
Figure 2:
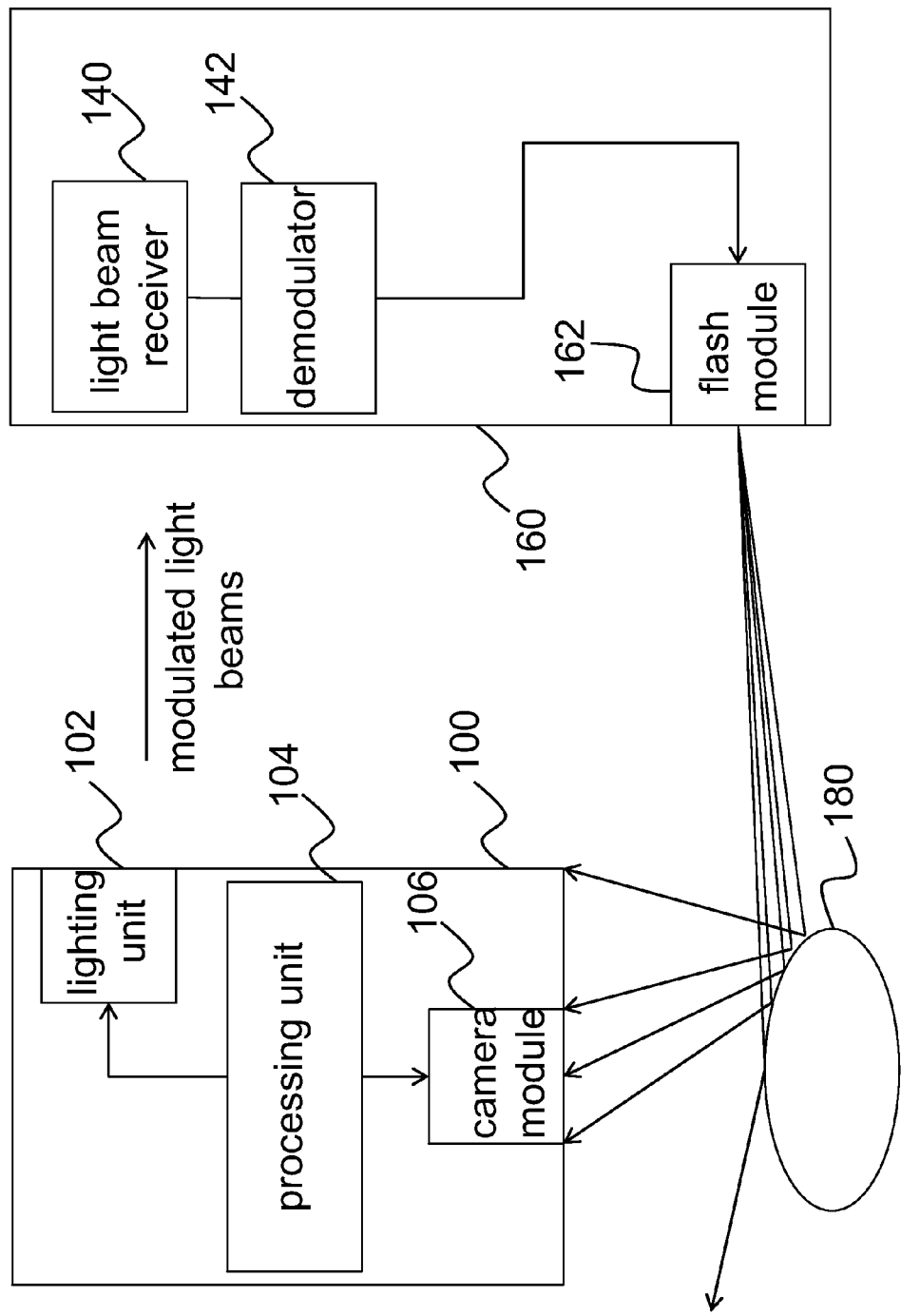
FIG. 2 is a schematic diagram of a system in a first embodiment for achieving communication between a mobile phone and an electronic device according to the present invention.

The present invention will now be described more specifically with reference to the following embodiments.
First Embodiment Please refer to FIG. 2 to FIG. 6. A first embodiment for achieving communication between a mobile phone and an electronic device is disclosed. FIG. 2 is a schematic diagram of a system 10. The system 10 includes a mobile phone 100, a light beam receiver 140, and a demodulator 142. The mobile phone 100 has a lighting unit 102, a processing unit 104, and a camera module 106. The light beam receiver 140 is embedded (built) in a high luminance flash 160.

The processing unit 104 is linked to the lighting unit 102 and the camera module 106. The mobile phone 100 can be used to take photos by the camera module 106. Since the background where a photographed target 180 located is too dark so that the lighting unit 102 can not provide light beams with sufficient luminance to have a better effect for the photographed target 180, the high luminance flash 160 is used to offer a strong flash at the moment the camera module 106 operates. Therefore, a communication between the mobile phone 100 and the high luminance flash 160 to transfer a message signal to trigger the high luminance flash 160 or ask the high luminance flash 160 for adjustment of luminance is required. The message signal is sent from the processing unit 104. When the message signal arrives the lighting unit 102 in form of high and low voltages which present a bit-1 and a bit-0, respectively, the lighting unit 102 can work accordingly. Namely, the lighting unit 102 modulates the light beams it sends with the message signal. The way the light beams are modulated is based on a communicating mode. The communicating mode is translating bits of the message signal into corresponding luminance of the light beams. For a better understanding of this, please see FIG. 3.

Figure 3:
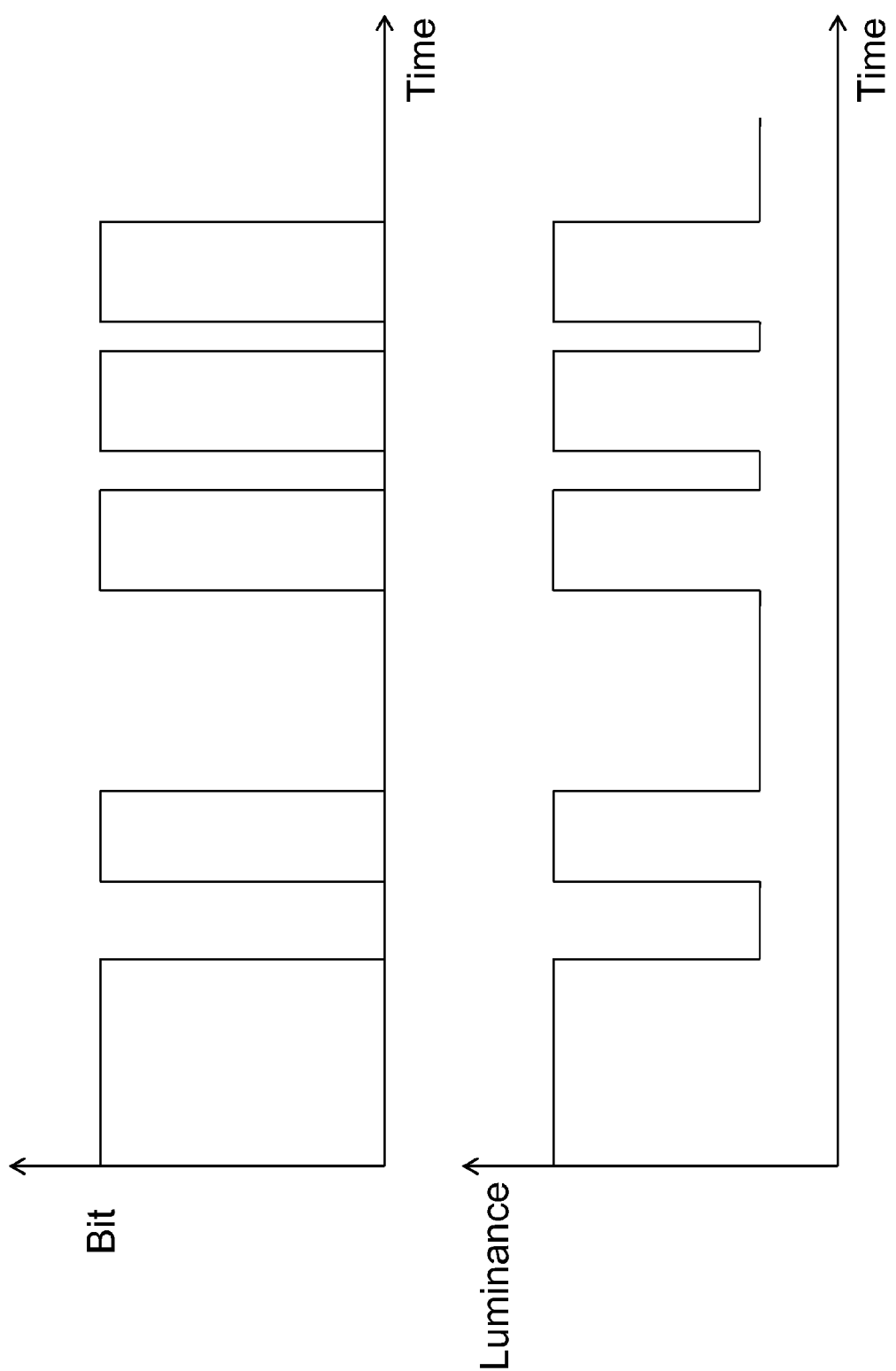
FIG. 3 illustrates a way how bits of a message signal are modulated onto light beams.
Figure 4:
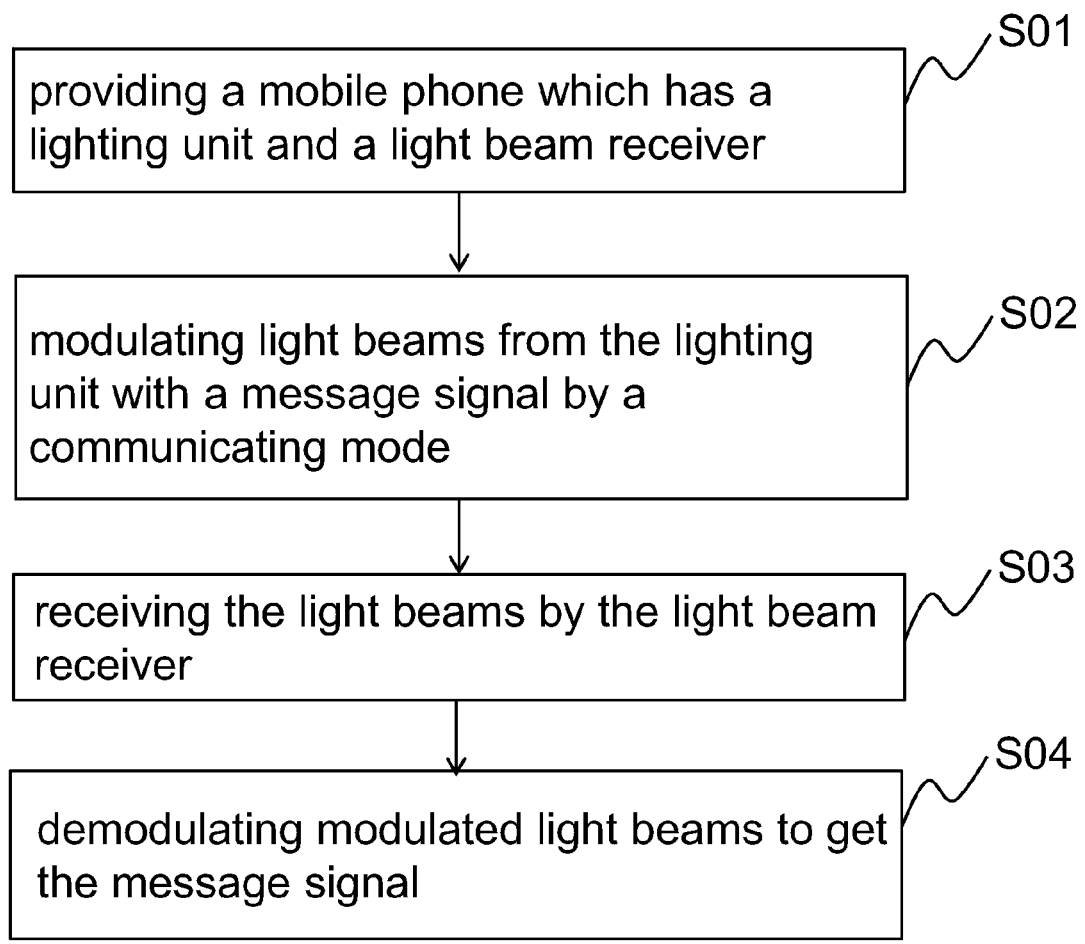
FIG. 4 is a flow chart of a method for achieving communication between a mobile phone and an electronic device according to the present invention.

FIG. 3 illustrates how the bits of the message signal are modulated onto light beams. A relationship between the bits of the signal sent and time is illustrated on the top of FIG. 3. A corresponding relationship between the luminance of the light beams and time is illustrated on the bottom of FIG. 3. It is obvious that the lighting unit 102 can illuminate with higher luminance when the high voltages (bit-1) are received while illuminate with lower luminance when the low voltages (bit-0) are received. An encrypting method may be applied but it is not the key point of the present invention. It should be emphasized that the corresponding method is not limited to the one mentioned above. The method can be reverse so that the lighting unit 102 illuminates with higher luminance when the low voltages (bit-0) are received while illuminates with lower luminance when the high voltages (bit-1) are received. On the other hand, the tempo light beams is modulated is not necessary as fast as the voltage signal does. The light beams can be modulated within the whole time longer than the period the signal completely reached the lighting unit 102. It will help an electronic shutter (not shown) to receive each bit without loss.

The light beam receiver 140 can receive the modulated light beams and transform the modulated light beams into an electric signal. After the electric signal is received, a demodulator 142 equipped in the high luminance flash 160 demodulates the electric signal to get the message signal and transmits the message signal to a flash module 162 of the high luminance flash 160. Flash light beams are triggered to emit to the photographed target 180. At the same time, the processing unit 104 of the mobile phone 100 sends a command to the camera module 106. The camera module 106 takes a picture with the reflected flashes from the photographed target 180.

From the description mentioned above, a method for achieving communication between a mobile phone and an electronic device can be found. Please refer to FIG. 4. The method begins to provide the mobile phone which has a lighting unit and a light beam receiver (S01). Then, modulate light beams from the lighting unit with a message signal by a communicating mode (S02). Next, receive the light beams by the light beam receiver (S03). Last, demodulate the modulated light beams to get the message signal (S04). A key point is that the light beam receiver can be connected to or embedded in an electronic device. The device is not limited to the high luminance flash 160 in the present embodiment. It can be any device which can be controlled by external signals or commands. For example, an electronic lock, or an appliance.

In this embodiment, the lighting unit 102 is a Light Emitting Diode (LED). In practice, the lighting unit in a mobile phone may contain more than one LED to form a LED module. The lighting unit 102 can also be a LED module. The light beam receiver 140 is used to receive light beams and can transform the light beams into another physical property, i.e. electrical signal. Thus, the light beam receiver 140 is a kind of photodetector. Preferably, a Complementary Metal Oxide Semiconductor (CMOS) sensor module can be used as the photodetector. Actually, a Charge Coupled Device (CCD) sensor module, a Passive Infrared (PIR) sensor, a photodiode, a photodiode module or an ambient light sensor can also be applied. The lighting unit 102 may be integrated to a standalone device rather than embedded in the high luminance flash 160. The standalone device can pass the electric signal to the high luminance flash 160 and the electric signal is demodulated in the high luminance flash 160. In this case, the lighting unit 102 is connected to the high luminance flash 160 externally.

Figure 5:
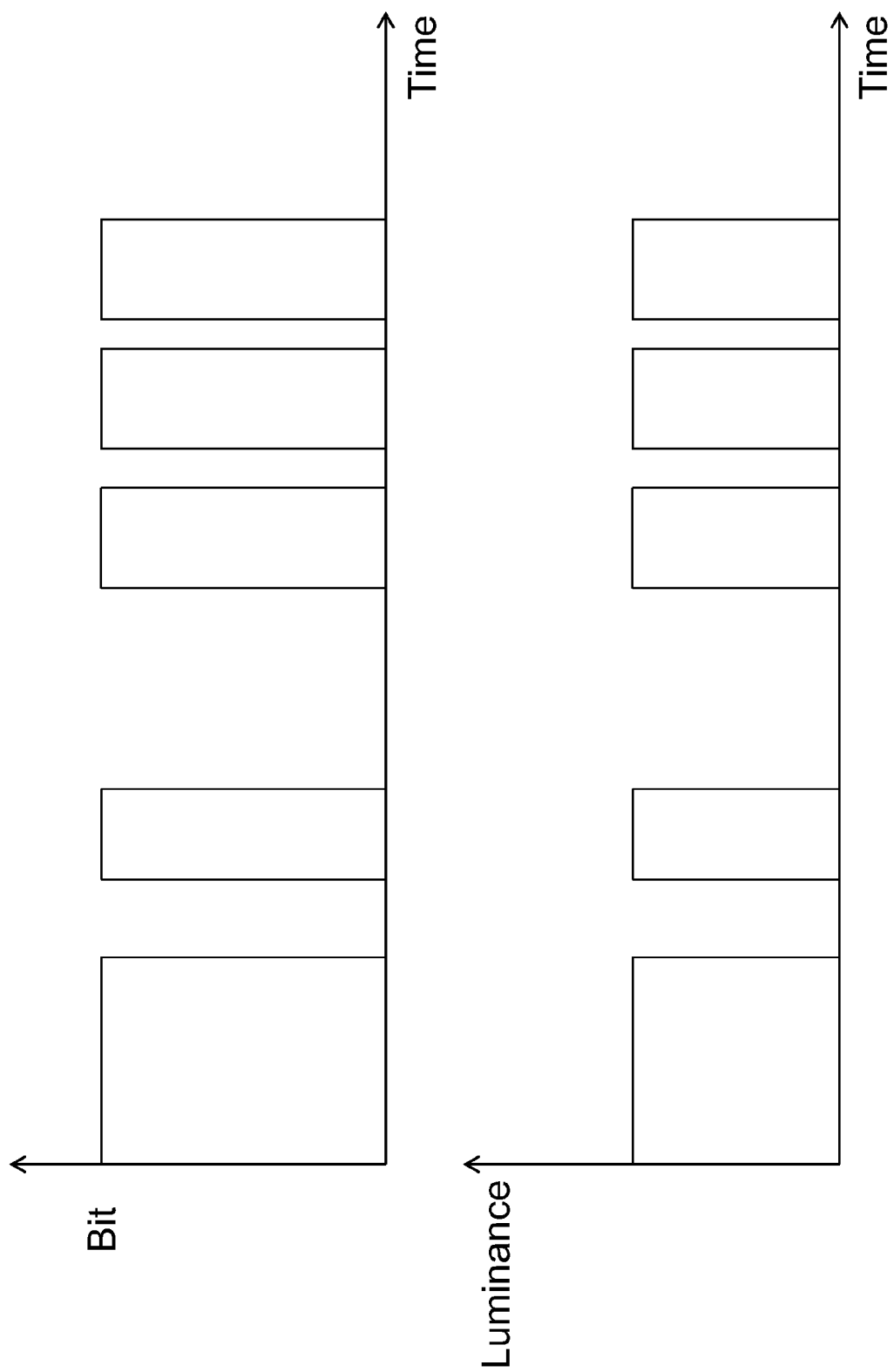
FIG. 5 illustrates another way how bits of a signal are modulated onto light beams.
Figure 6:
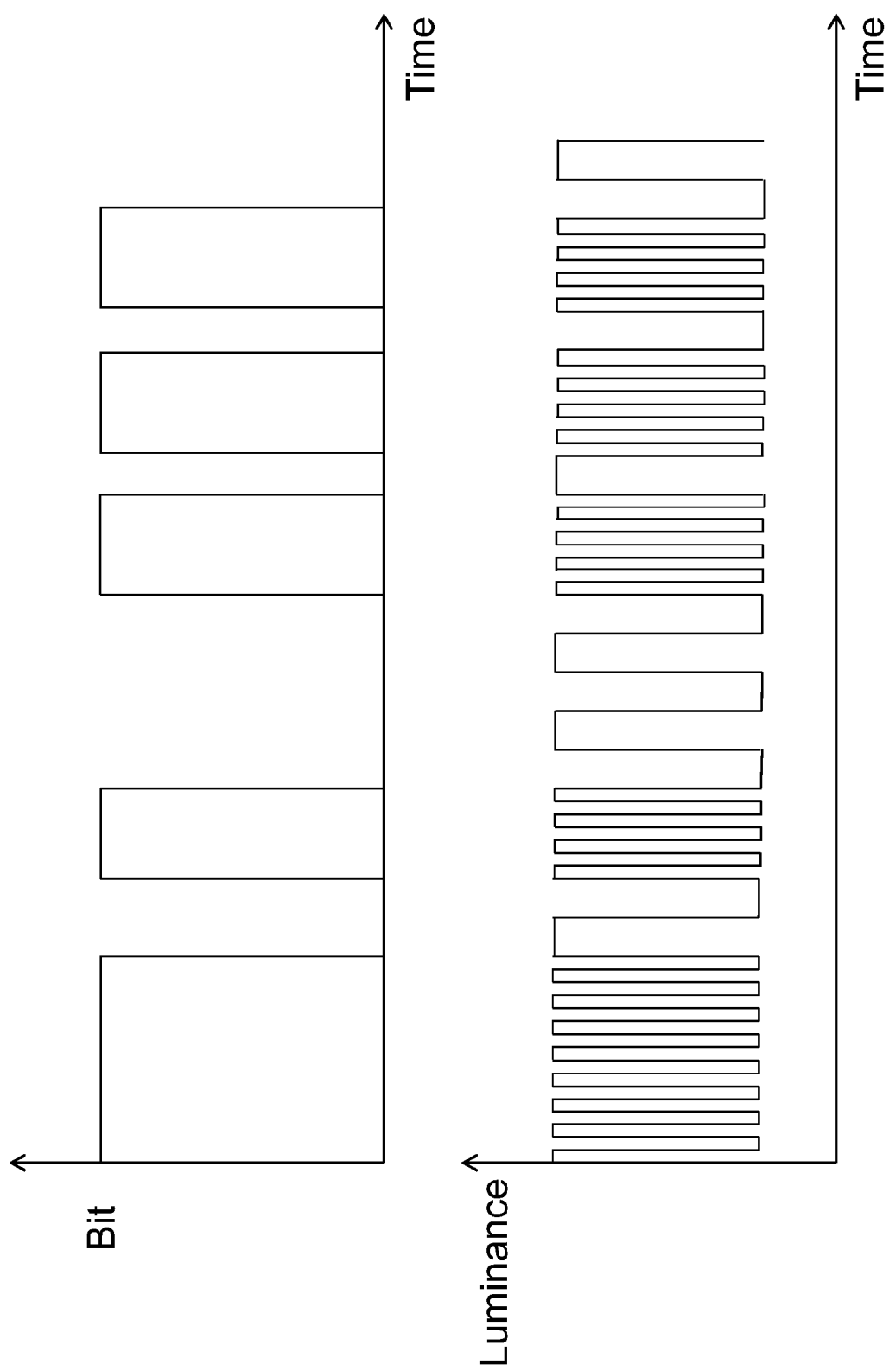
FIG. 6 illustrates still another way how a signal is modulated onto light beams.

It should be noticed that another communicating mode can be applied. Since the luminance of light beams will be minimal if the lighting unit 102 turns off, the communicating mode is translating bits of the message signal into corresponding on/off of the light beams as shown in FIG. 5. Namely, the bit-0 corresponds to "no light". Besides, the communicating mode may be translating bits of the message signal into corresponding frequency of the light beams varying between different luminance. The lighting unit 102 can illuminate with higher frequency when the high voltages (bit-1) are received while illuminate with lower frequency when the low voltages (bit-0) are received. Of course, like the previous example, it is possible to be reverse. Because the modulation is based on frequency, a maximal/minimal luminance in a single shine of light beams is not necessary the same as that of others. In fact, luminance of the lighting unit 102 may not keep the same level due to physical conditions.

Second Embodiment

In the previous embodiment, the communicating mode is to modulate the message signal bit by bit. Therefore, demodulated signal is also received bit by bit. The modulating method is available for electric signals. It can also provide abundant information, even carrying programmed codes. However, in some circumstance, it may cause uncomfortable feeling to human eyes due to a long-time flash of light. Hence, the bits of the message signal should be further arranged and given a pre-set command or function for each arrangement. A second embodiment discloses other communicating modes that modulate the light beams with a special format of the message signal.

Figure 7:
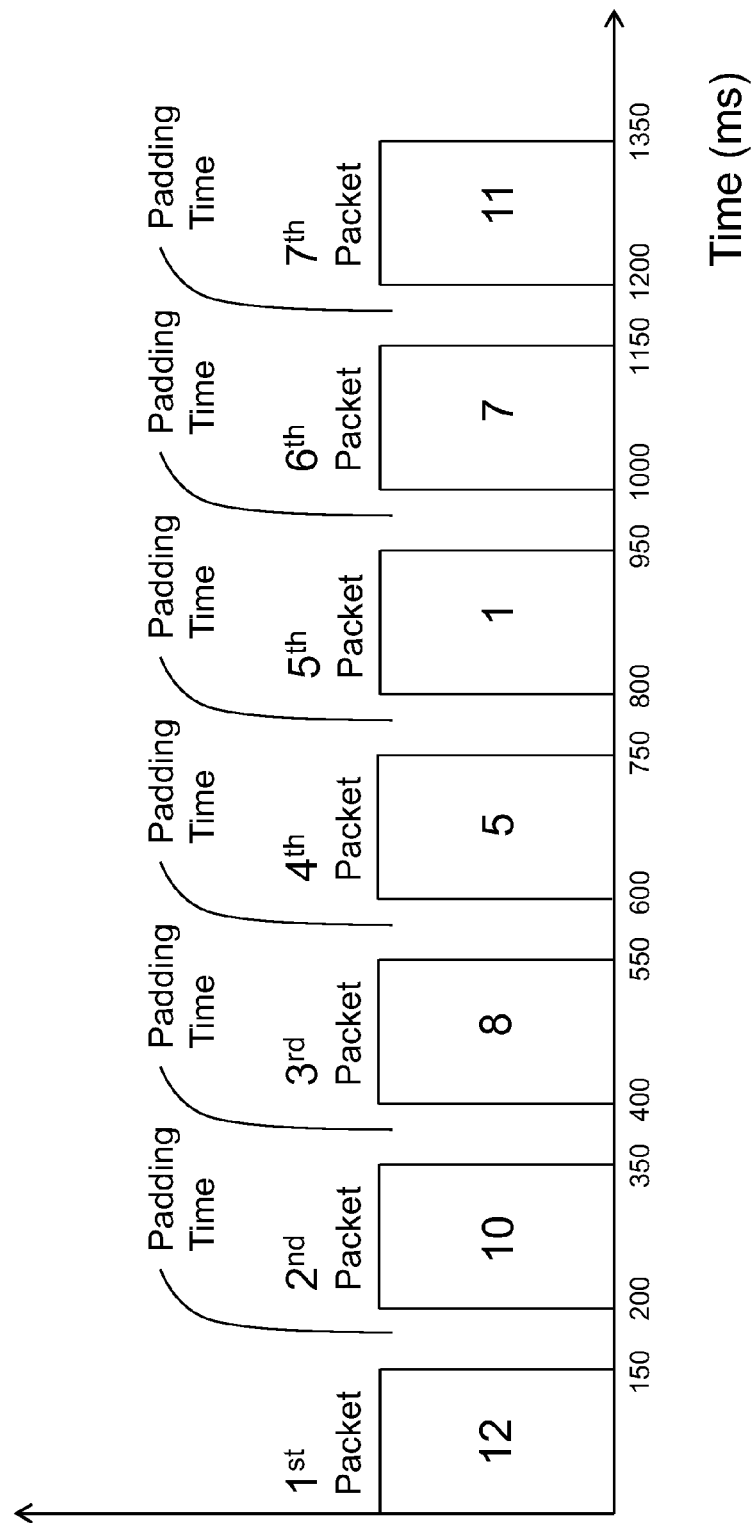
FIG. 7 shows modulated light beams carrying a message signal which is segmented.

Please see FIG. 7 to FIG. 13. The second embodiment is illustrated by referring thereto. For illustration purpose, elements in FIG. 2 will be appropriately introduced below. FIG. 7 shows modulated light beams carrying a message signal which is segmented. The message signal includes a number of packets arranged in sequence, each packet containing at least one on-message. In the example shown in FIG. 7, the message signal is composed of 7 packets ($1^{st}$ packet, $2^{nd}$ packet, $3^{rd}$ packet, $4^{th}$ packet, $5^{th}$ packet, $6^{th}$ packet, and $7^{th}$ packet). The on-message is used to trigger the lighting unit 102. Each packet is controlled to be translated within a corresponding sub-period. A padding time exists between two sequent sub-periods. Duration of the padding time should not be too long in case the message signal will be transmitted in a longer time. Under this situation, the padding time of 50 ms and the sub-period of 150 ms are preferable and recommended. In operation, the transferring time of the message signal over the light beams should better be less than 1.5 second. This is because a longer time of light beam flashes will cause uncomfortable feeling to human eyes. Meanwhile, users may not be patient to wait for so long. Since time interval between two successive LED shines in general mobile phones is about 10 ms, there should be around 15 shines in one single sub-period. It means one sub-period can carry 15 sub-signals. In this example, there are 7 sub-periods for 7 packets. Combinations of number of shines and sub-periods provide $15^7$ ways to express one message signal. Thus, if the message signal can be encoded to 7 groups of on-messages and decoded when being received, transfer can be easier. Padding time and sub-period are not limited to 50 ms and 150 ms, respectively. Any time longer than 10 ms is theoretically workable. However, it is recommended to set each one no shorter than 50 ms. A parity check may come after the message signal to make sure the transfer is safe and complete. In fact, the padding time is not limited to a fixed value (equal). It can vary in a predetermined way. For example, the first padding time is 50 ms, the second padding time is 60 ms and the third padding time is 70 ms. The rest padding times appear in sequence following a 50 ms-60 ms-70 ms pattern and repeat the pattern. As long as the pattern can be recognized, any pattern is workable.

In general, the communicating mode in this embodiment is segmenting a specified period into several sub-periods which have the same number as the packets, converting each on-message into a light feature, and sequentially providing a number of light feature the same as the number of on-message in a packet within a sub-period. If there are many styles of light features, the communicating mode may be segmenting a specified period into several sub-periods which have the same number as the packets, converting all on-messages in a packet into a specified light feature, and sequentially providing the specified light features corresponding to each packet. In one example, the specified period is 1350 ms. One on-message is translated to a shine of light beams. Shine of light beams is the said light feature. In FIG. 7, the first sub-period for the $1^{st}$ packet to transmit lasts from 0 second to 150 ms, a padding time after the first sub-period is from 150 ms 200 ms, and so on. The $7^{th}$ packet transmitted in a seventh sub-period which stops at 1350 ms. The message signal is also transmitted completely at this moment. However, during each sub-period, the number of on-messages in the corresponding packet varies. Basically, the light beam receiver 140 receives shines of light beams which are a sequence of 12, 10, 8, 5, 1, 7, and 11. Different sequence of number of shines of light beams can be assigned to a specified action of any device. An example is shown in FIG. 8. For instance, a sequence of 12, 7, 3, 11, 12, 8, and 5 for the high luminance flash 160 is to provide flash 0.2 s after the message signal is received. However, for a refrigerator, it means to control the temperature at 15 degree. It is to say the same mode (mode 1, 2, 3, and 4) of shines of light beams according to FIG. 8 can be applied to any device as long as it is communicated with and controlled by the mobile phone 100.

It is obvious from FIG. 8 that the $1^{st}$ packet in any mode all comprises 12 times of shines of light beams. A sub-message in the $1^{st}$ packet can be seen as an initiating message so that the light beam receiver 140 knows a message signal is sending. According to the spirit of the present invention, at least the $1^{st}$ packet should have a designated format of on-messages. In this case, the format of on-messages is 12 successive on-messages. However, the designated format can be combining the first two packets. It is to say, for example, the $1^{st}$ packet of 12 shines of light beams and the $2^{nd}$ packet of 8 shines of light beams represent the initiating message. It should be emphasized that the initiating message is a part of message signal, but just for notification.

Figure 9:
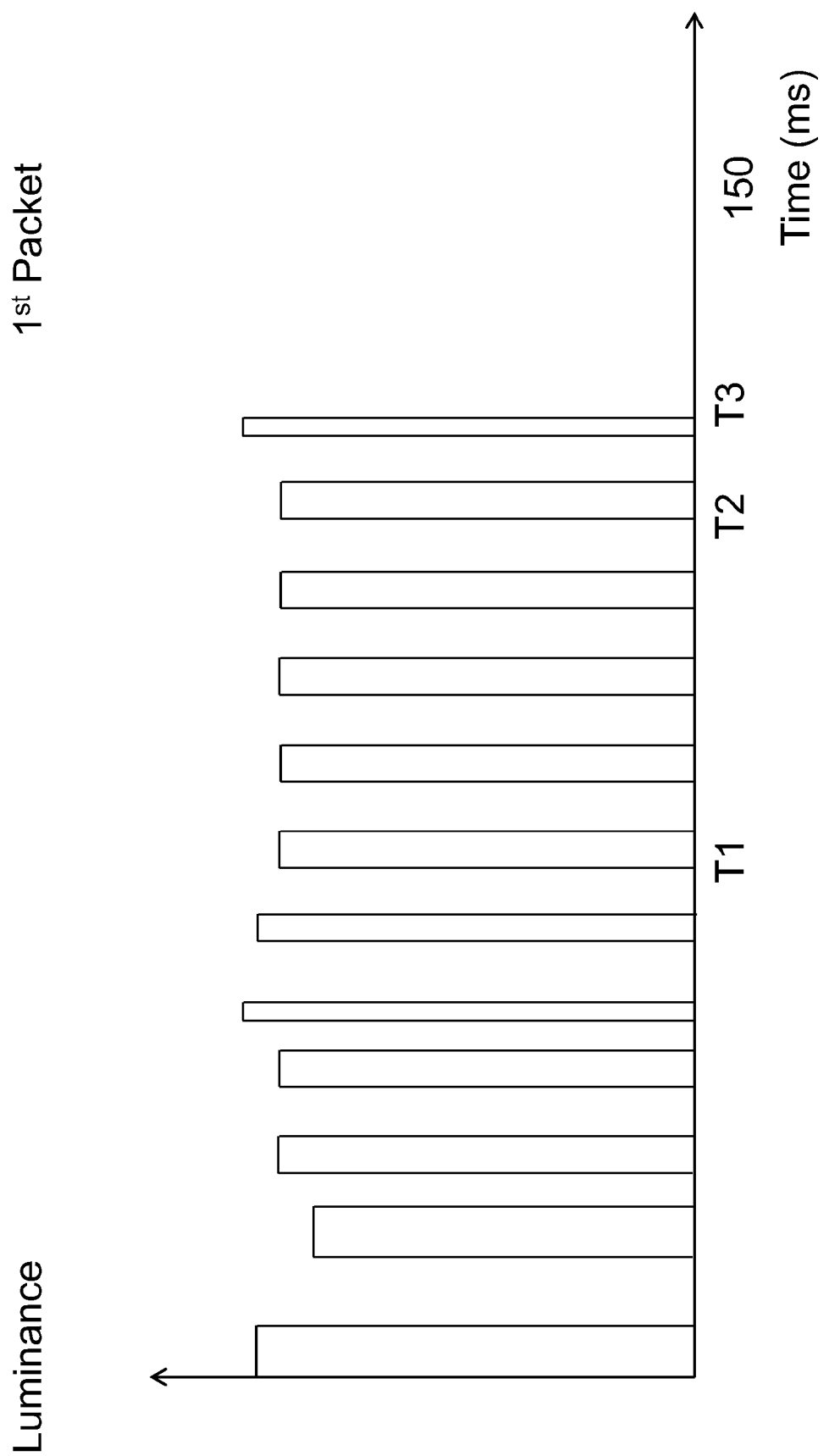
FIG. 9 shows a commonly seen situation of a packet in a first sub-period.

In practice, each shine of light beams from the lighting unit 102 may not have consistent luminance. Time interval between two successive shines of light beams also varies from time to time. This is because hardware of the mobile phone 100 may be affected by physical condition, such as temperature. This is also why the present invention considers the number of shines in a specified sub-period, rather than the frequency in a sub-period. FIG. 9 shows a commonly seen situation of the $1^{st}$ packet in the first sub-period. It is clear that form 0 second to T1, luminance of every shine of light beams is different. Time intervals thereinbetween also vary. From T1 to T2, the situation becomes stable. However, after T2 and to the end of the 1st packet, T3, each shine of light beams becomes unstable again. Sometimes, one time interval may last to 30 ms. Therefore, The duration of sub-period should be longer enough to avoid such situation in case an incorrect sub-message is received with one shine of light beams lost.

Figure 10:
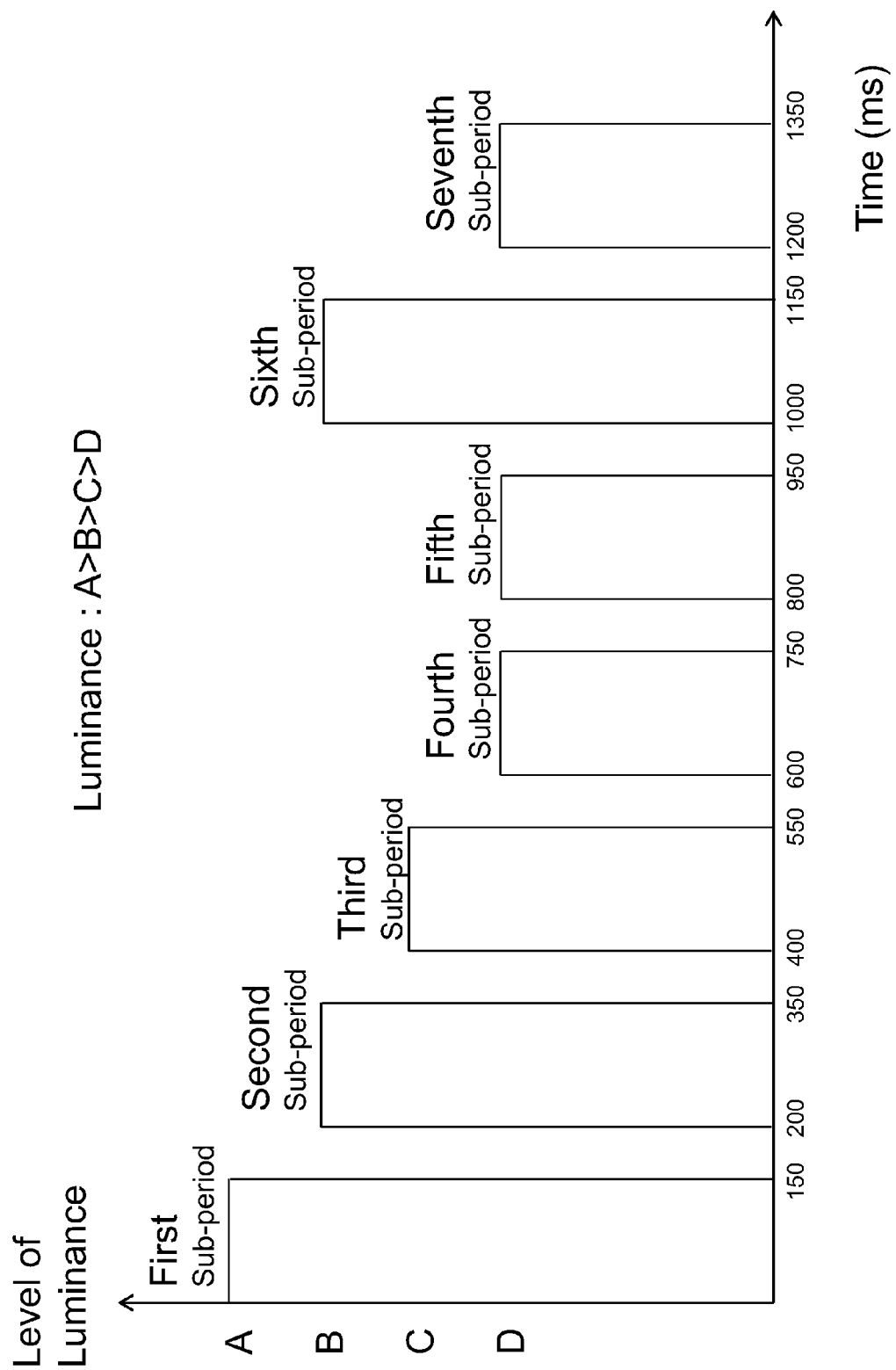
FIG. 10 illustrates levels of luminance of light beams in every sub-period.
Figure 11:
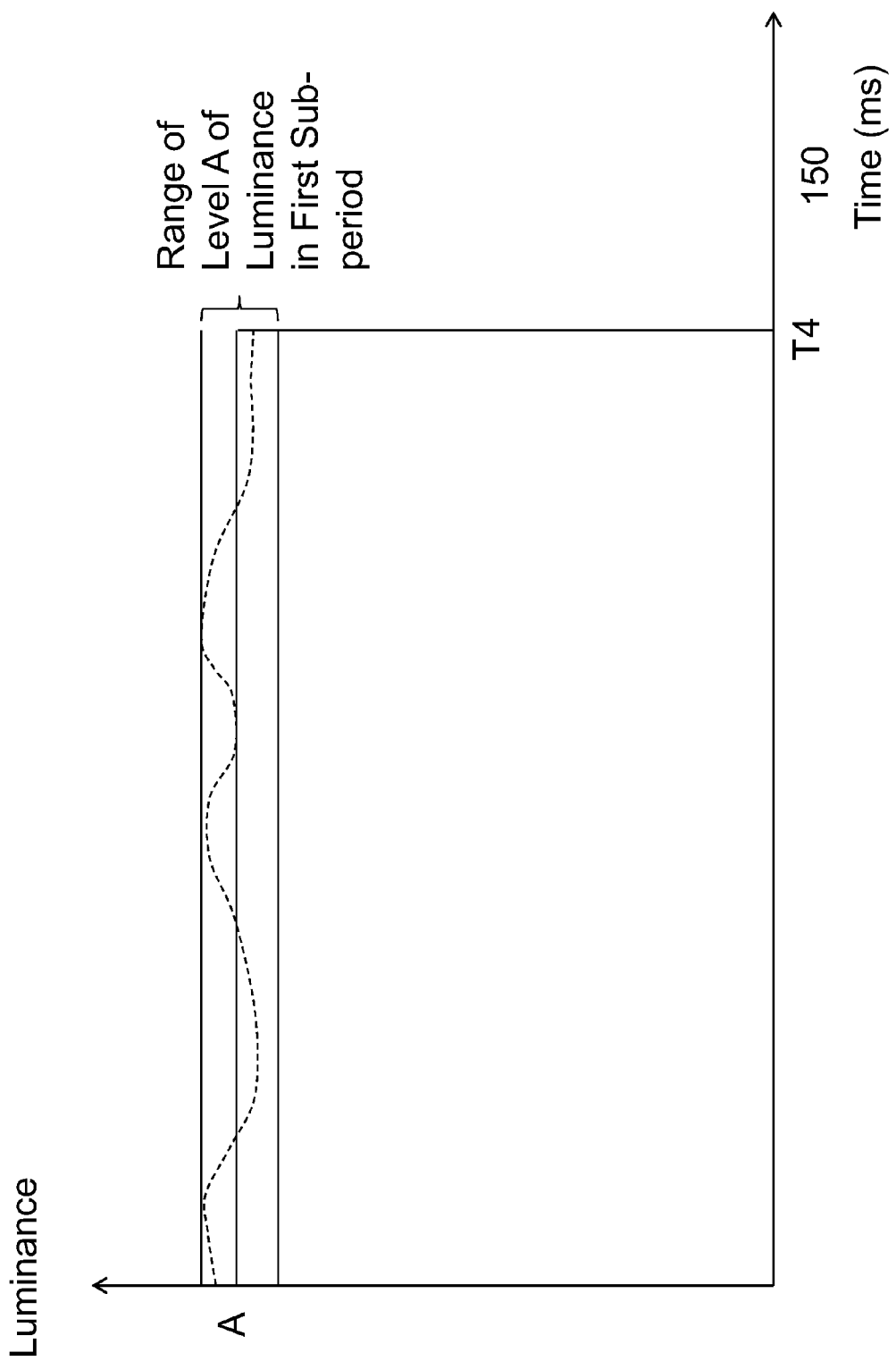
FIG. 11 illustrates a range of a level of luminance in a sub-period.
Figure 12:
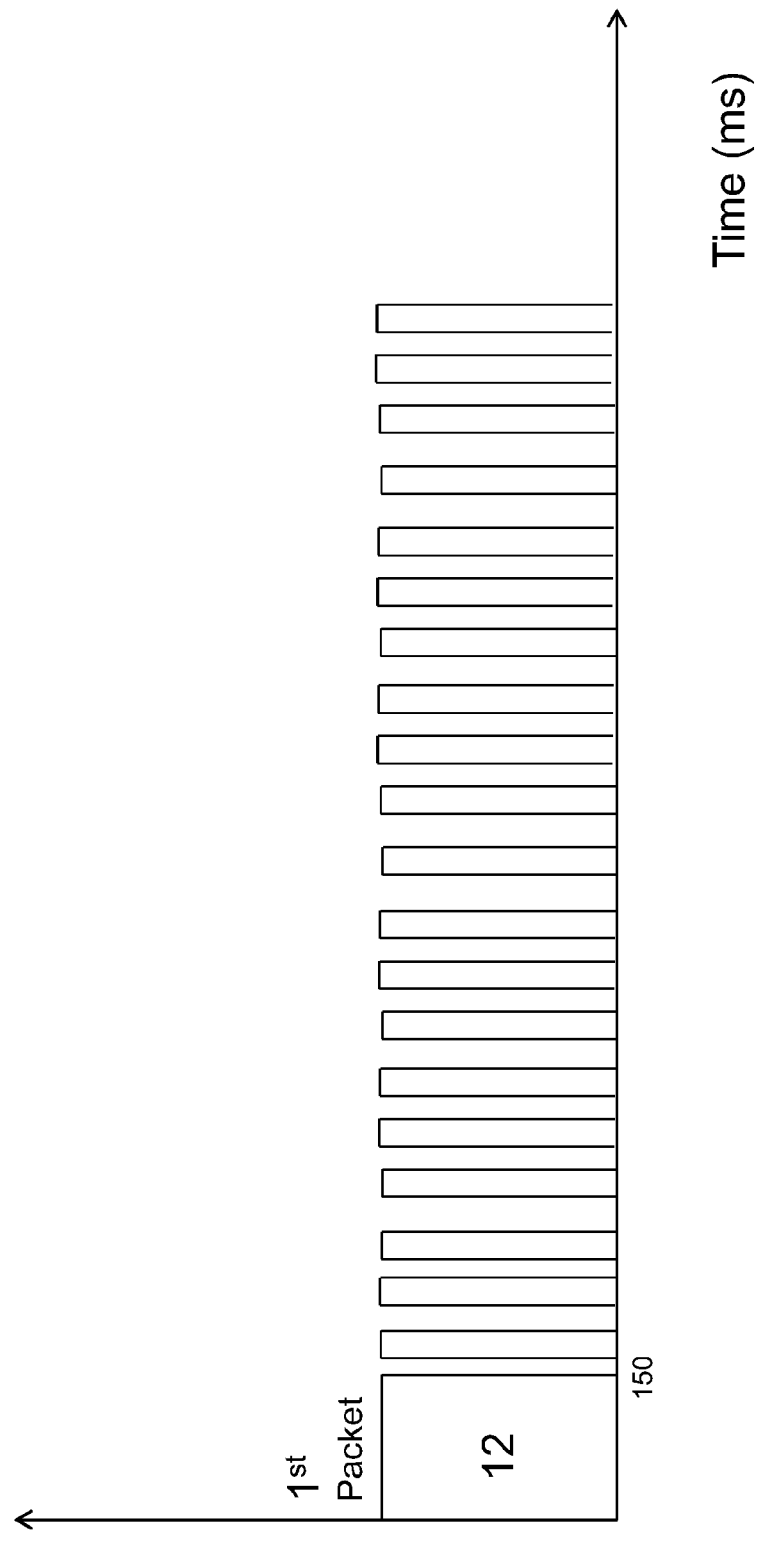
FIG. 12 shows shines of light beams in different packets.

As mentioned above, in this embodiment, the communicating mode can also have different types of light feature. Another example of light feature is a specified luminance of light beams. In order to have a better understanding, please refer to FIG. 10. FIG. 10 illustrates levels of luminance of light beams in every sub-period. Level A has higher luminance than level B. Level B has higher luminance than level C. Level C have higher luminance than level D. By assigning a specified number on-message for each level, a corresponding luminance will be available during a sub-period. For example, assigning 4 on-messages for level A, 3 on-messages for level B, 2 on-messages for level C and 1 on-message for level D. A combination of levels of luminance in sequential sub-periods can refer to one action for a device. Luminance of each level should be significantly away from other level. In addition, any level should not mean a specified luminance. It should have a range. As shown in FIG. 11, luminance in the first sub-period varies from time to time. A range of level A of luminance in the first sub-period is defined within two horizontal lines. Level A will be determined when luminance of light beams fall between the two lines. The communicating mode can also be a combination of shines of light beams and specified luminance. For example, it can be implemented by interleavedly assigning level of luminance in the packets to represent on-messages while other on-messages still count.

Figure 13:
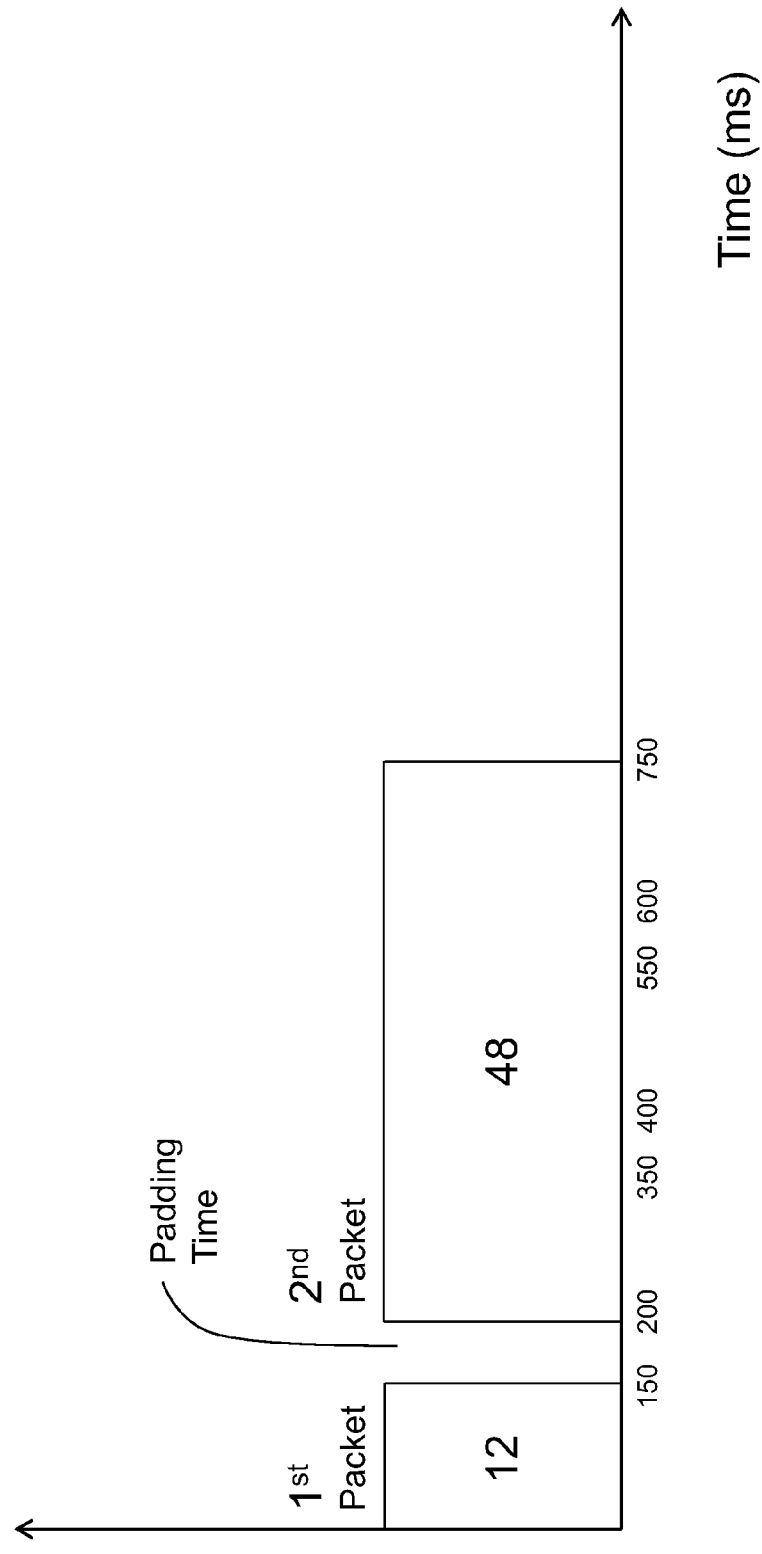
FIG. 13 shows a message signal carried by two shines of light beams.

According to the spirit of the present invention, a combination of shines of light beams in sequence can refer to a message signal for an action. Simply assign a number of shines of light beams can also achieve the same goal. Please see FIG. 12. After the $1^{st}$ packet in the first sub-period as an initiating message, there are 20 sub-periods. Each sub-period has only one shine of light beams. The number of shines of light beams comes after the first sub-period refers to one specified action. For instance, 20 shines of light beams (packets) mean keeping the refrigerator at 17 degree while 21 shines of light beams mean keeping the refrigerator at 16 degree. Under this situation, the sub-period and the padding time should not be too long as defined above. Except the first sub-period, the rest sub-period can be set around 50 ms. Padding time of 20 ms should be workable. Further, the number of shines of light beams in the sub-periods except the first one can be consolidated into one sub-period. Namely, the message signal is transmitted in two sub-periods. The real command is sent within the second sub-period by counting the number of shines of light beams. As shown in FIG. 13, it depicts 48 shines of light beams provided in the second sub-period.

From the description, each sub-period has the same duration. In fact, they can be different but should appear in an order. For example, the sub-periods can be 150 ms for the first one and 100 ms for the second, repeating the same pattern of durations for rest sub-periods. Meanwhile, the sub-period may not always last the same time. If it contains fewer shines of light beams, duration can be shortened. The sub-period can be terminated if a terminating time passes by after the last shine of light beams vanish. For example, if the last shine of light beams in a sub-period ends at 70 ms but no other shine of light beams shows up after the coming 50 ms, the current sub-period is terminated at 120 ms and followed by a padding time. The sub-period now is 120 ms, rather than the pre-set 150 ms. Here, the 50 ms is so-called terminating time. The terminating time can be set to any time less than the duration of the sub-period, or it is not necessary for operating the system 10.

It should be notice that in the two embodiments, the mobile phone 100 is an example in the system 10. According to the present invention, the mobile phone 100 can be replaced by other mobile devices, such as a tablet or a laptop computer.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A system for achieving communication between a mobile device and an electronic device, comprising:
   a mobile device, having a lighting unit, which modulates light beams therefrom with a message signal by a communicating mode;
   a light beam receiver, connected to or embedded in an electronic device, for receiving the modulated light beams and transforming the modulated light beams into an electric signal; and
   a demodulator, equipped in the electronic device, for demodulating the electric signal to get the message signal,
   wherein the message signal comprises a plurality of packets arranged in sequence, each packet containing at least one on-message.

2. The system according to claim 1, wherein the communicating mode is translating bits of the message signal into corresponding luminance of the light beams, corresponding on and off of the light beams, or corresponding frequency of the light beams varying between different luminance.

3. The system according to claim 1, wherein at least the first packet has a designated format of on-messages.

4. The system according to claim 1, wherein the communicating mode is segmenting a specified period into a plurality of sub-periods which have the same number as the packets, converting each on-message into a light feature or all on-messages in a packet into a specified light feature, and sequentially providing a number of light feature the same as the number of on-message in a packet within a sub-period or the specified light features corresponding to each packet.

5. The system according to claim 4, wherein a padding time exists between two sequent sub-periods.

6. The system according to claim 4, wherein each sub-period has the same duration.

7. The system according to claim 1, wherein the mobile device is a mobile phone, a tablet or a laptop computer.

8. The system according to claim 4, wherein the light feature is a shine of light beams, a luminance of light beams, or a combination thereof.

9. The system according to claim 4, wherein one sub-period is terminated if a terminating time passes by after the last light feature vanishes.

10. The system according to claim 1, wherein the lighting unit is a Light Emitting Diode (LED) or a LED module.

11. The system according to claim 1, wherein the light beam receiver is a photodetector.

12. The system according to claim 11, wherein the photodetector is a Complementary Metal Oxide Semiconductor (CMOS) sensor module, a Charge Coupled Device (CCD) sensor module, a Passive Infrared (PIR) sensor, a photodiode, a photodiode module or an ambient light sensor.

13. A method for achieving communication between a mobile device and an electronic device, comprising the steps of:
providing a mobile device which has a lighting unit and a light beam receiver;
modulating light beams from the lighting unit with a message signal by a communicating mode;
receiving the light beams by the light beam receiver; and
demodulating modulated light beams to get the message signal,
wherein the light beam receiver is connected to or embedded in an electronic device; and
wherein the message signal comprises a plurality of packets arranged in sequence, each packet containing at least one on-message.

14. The method according to claim 13, wherein at least the first packet has a designated format of on-messages.

15. The method according to claim 13, wherein the communicating mode is segmenting a specified period into a plurality of sub-periods which have the same number as the packets, converting each on-message into a light feature or all on-messages in a packet into a specified light feature, and sequentially providing a number of light feature the same as the number of on-message in a packet within a sub-period, or the specified light features corresponding to each packet.

16. The method according to claim 15, wherein a padding time exists between two sequent sub-periods.

17. The method according to claim 15, wherein each sub-period has the same duration.

18. The method according to claim 15, wherein the light feature is a shine of light beams, a luminance of light beams, or a combination thereof.

* * * * *